United States Patent [19]

Sober

[11] Patent Number: 5,202,827

[45] Date of Patent: Apr. 13, 1993

[54] APPARATUS FOR INSURING FUTURES CONTRACTS AGAINST CATASTROPHIC LOSS

[76] Inventor: Michael S. Sober, 60 Sutton Pl. S., New York, N.Y. 10022

[21] Appl. No.: 521,531

[22] Filed: May 10, 1990

[51] Int. Cl.$^5$ .......................... G06F 15/20; G06G 7/52
[52] U.S. Cl. ..................................... 364/408; 364/401; 364/406
[58] Field of Search .................. 364/401, 408, 406; 434/107

[56] References Cited

U.S. PATENT DOCUMENTS

| 4,412,287 | 10/1983 | Braddock, III | 364/408 |
| 4,677,933 | 7/1987 | Rotella | 434/107 |
| 4,823,265 | 4/1989 | Nelson | 364/406 |
| 4,903,201 | 2/1990 | Wagner | 364/408 |
| 5,126,936 | 6/1992 | Champion et al. | 364/401 |

OTHER PUBLICATIONS

Medford, Crockett, "Amex, NASD to Embrace Trading Via Computer", Jan. 11, 1988, Information week, p. 21.
Donnelly, "Is Portfolio Insurance All It's Cracked Up to Be?", Nov. 1986, Institutional Investor, v20n11, pp. 125-139 (full article not currently available).

Primary Examiner—Roy N. Envall, Jr.
Assistant Examiner—Jennifer L. Hazard
Attorney, Agent, or Firm—Darby & Darby

[57] ABSTRACT

Point-of-sale stations serve as data entry points for customer transactions including various data for insurance unit purchases and renewals, unit cancellations resulting from investor- or broker- initiated sales of insured futures contracts, and insurance-activated sales when the price of the futures contract has declined below the insurance activation price. A central office computer receives, tests and processes the customer transaction data from the multiple point-of-sale stations. The central system provides information concerning the number and type of futures contracts currently insured, as well as how the current investment portfolio matches the current projection of possible loss claims against the insurance plan. By comparing the current price with the purchase price of the futures contract, it is determined when the insured's loss has exceeded the insurance activation price, at which time the futures position is to be sold by the broker. The central system provides periodic reports concerning insurance transactions.

1 Claim, 5 Drawing Sheets

APPARATUS FOR INSURING FUTURES CONTRACTS AGAINST CATASTROPHIC LOSS

IDENTIFICATION OF RELATED DISCLOSURE DOCUMENT

This invention relates to the subject matter of Disclosure Document No. 245,000 filed with the United States Patent and Trademark Office by the inventor.

BACKGROUND OF THE INVENTION

1. Field of the Invention

This invention relates to methods and apparatus for implementing and administering an insurance program to protect against relatively large liabilities with a small probability of occurrence, specifically, a precipitous move in stock market prices, and consequently a corresponding move in the price of futures contracts or index options, caused by an unexpected catastrophe such as a sudden grave illness or death of the President of the United States.

2. Description of the Related Art

For the sake of clarity the following description of this invention will only discuss the situation where financial futures contracts are bought and the insurance covers precipitous declines in the price of the contracts. It should be noted, however, that this invention also applies to the situation where financial futures contracts are sold, in which case the system creates, monitors and administers insurance against precipitous increases in the price of the contracts. The invention may be similarly advantageously applied to the purchase and sale of commodity futures contracts, options on futures contracts and index options as well.

Investors are risk averse in various degrees and use various strategies to limit their risk to desired levels. In most cases there will be an orderly market and the investor's strategy will result in the limiting of loss to an amount which closely corresponds to the desired degree of risk. However, the rare occurrence of an unexpected catastrophe such as a sudden grave illness or death of the President of the United States could likely cause a disorderly market or even a halt in trading, with the result that the investor's risk-limiting strategy fails and a much larger degree of loss is sustained. For example, stop-loss orders would probably not work as desired after an unexpected catastrophe because the market price would likely incur a trading gap and pass right through the stop-loss point. The distance between the lower actual price at which the stop-loss order is filled and the higher stop-loss point represents an additional degree of undesired risk, and this additional risk can be much larger than the expected degree of risk. That is, the strategies to limit risk are successful in most cases but do not protect against relatively large liabilities with small probabilities of occurrence. Thus, the strategies have no insurance protection aspects.

SUMMARY OF THE INVENTION

According to the present invention, a system is provided to establish and monitor an "insurance activation price" somewhere below the purchase price of a futures contract. While the insured investor bears all of the loss between the purchase price and the insurance activation price, the insurer bears most of the risk below the insurance activation price and the insured acts as co-insurer for decreasing percentages of the loss as the size of the loss increases. Thus, a form of "insurance" is created, monitored and administered.

To briefly illustrate how this inventive system operates, assume the current price of the insured futures contract which was purchased at any time during the trading day has declined to one tick more than the insurance activation price of, for example, ten points below the purchase price. By prior arrangement between the insurer and the broker (and by the insured through acceptance of the terms of the insurance contract), the futures contract is immediately sold "at the market." The broker's round-turn commission is then charged to the insured.

In this example the insured may bear the full loss on the first ten points in price. The insurer may be liable for 80%, as an example, of the second ten points of loss, with the insured acting as co-insurer for 20% of the loss on the second ten points. The insurer may be liable for 90% of the loss on the third ten points, with the insured acting as co-insurer for 10% of the loss on the third ten points. In this example, the insurer may be liable for all of the loss beyond thirty points in price.

Thus, if an insured futures contract has been bought at 340.00, according to the invention it would be automatically sold when the price dropped to or through the insurance activation price of 329.95. In the event that there was a gap in prices from 338.00 to 306.00 and the insurer's "sell at market" order was exercised at 305.50, then the total loss to the insurer would be

| | |
|---|---|
| 340.00–330.00 | 10.0 points |
| 330.00–320.00 | 2.0 |
| 320.00–310.00 | 1.0 |
| 310.00–305.50 | 0.0 |
| | 13.0 points, | or $6,500.

The total loss to the insurer would be:

| | |
|---|---|
| 340.00–330.00 | 0.0 points |
| 330.00–320.00 | 8.0 |
| 320.00–310.00 | 9.0 |
| 310.00–305.50 | 4.5 |
| | 21.5 points, | or $10,750.

The insurance activation price may be established at other price levels below the purchase price, and indeed would likely be different for different underlying commodities. In addition, the co-insurance percentages and spreads can be other than those used in the example.

Insurance will automatically expire when trading begins on the next trading day. Thus, unless renewed, insurance will be in force no longer than from the time of purchase until the market opens on the next trading day. If the next trading day is a Monday or the day after a holiday an extra insurance premium may desirably be charged because there is more time in which the unexpected catastrophe can occur.

If the insurance is renewed, then the new "purchase price" will be the next day's opening price and the new insurance activation price will be the contractually specified number of points below the new "purchase price".

Since it is not the purpose of this invention to provide a system which establishes a cheap "out-of-the-money" put for protection against very large market declines such as Oct. 16 and 19, 1987 and Oct. 13, 1989, the insurer would have the right to refuse insurance contracts at any time. For example, if the market has dropped so that the futures contract is now eight points below the opening price the insurer might decide not to accept any more new insurance or renewals until further notice. Or, the market having fallen 108 Dow points on Oct. 16, 1987, the insurer might not decide to accept any insurance for Monday, October 19.

In order to prevent fraud, it may be desirable for the insurer to elect to refuse insurance contracts at any time when more than five minutes have elapsed between the time the insurance was ordered and the time the unit purchase data are transmitted to the central office computer. This feature would not apply to insurance contracts mandated by either broker or the exchange. Thus, if a catastrophe had occurred at 7:45 PM, then the insurer may desirably refuse a renewal received at 7:55 PM which stated that the renewal was ordered at 7:30 PM. The same thing could happen during the trading day. Alternatively, the insurer could stipulate that there always is a waiting period, say fifteen minutes, between the time the purchase unit is received and the time the insurance becomes enforceable.

This invention is valuable to commodities brokers and commodities exchanges as well as to investors. Since investors initially pay only a predetermined margin deposit which is equal to a small percentage of the value of each futures contract, a precipitous decline in prices could result in a loss larger than the amount of margin the investor has deposited with the broker, and put the broker in the position of having to collect from the investor. This insurance program will relieve the broker of most of this risk.

If there was an exchange requirement that all risk-producing purchases of futures contracts (i.e., all except those that are: (1) fully collateralized; (2) closing out a short position, and; (3) those that are truly fully hedged) be insured against precipitous price declines, then the exchange could expect to gain investor confidence and possibly an increase in business.

In the alternative, it may be desirable to exclude from the insurance program those purchases of futures contracts where the duration of ownership is extremely short. This may be accomplished by establishing a minimum holding period of, e.g., five minutes. In this event, the time of sale would be added to the transmitted sales unit data described hereinbelow.

Another way to exclude short duration ownership would be to insure only the "open interest," i.e., those contracts held overnight.

In view of the foregoing, it is the object of this invention to provide methods and apparatus for implementing an insurance program which protects the investor or broker against a major portion of the additional risk which could result from a precipitous decline in futures contract prices when an unexpected catastrophe occurs.

This object of the invention is accomplished by providing a data processing system which implements an insurance program designed to protect the insured against a loss larger than: (1) a specific number of points measured by the difference between the purchase price and the insurance activation price, plus (2) a small portion of the additional loss for which the insured acts as co-insurer.

When the market price of the insured futures contract has declined to one tick more than the insurance activation price the futures contract is immediately sold. The insurer thus assumes all additional risk, except for the co-insurance portion, below the insurance activation point. It should be understood that the insurance activation point is different from, and usually will be lower than, a stop-loss point established by the insured.

The system also provides for the integration of investment techniques in such a way so as to make the investment portfolio funded by the reserves perform in a manner which would tend to offset a significant portion of the loss claims against the insurance plan. The system processes insurance unit transactions to update the program's asset and insurance liability positions, provides information to management to help in the investment of the portfolio, and provides reports regarding premium income. Other reports may advantageously be provided as well, such as insurance losses and claims paid, if any, insurance business by broker, and the like.

Further features of the invention, its nature and various advantages will be more apparent from the accompanying drawings and the following detailed description of an illustrative embodiment of the invention.

DETAILED DESCRIPTION OF THE PREFERRED EMBODIMENTS

The data processing system for administering the program consists of a central computer connected to a network of remote point-of-sale stations and to a real-time source of data which supply current price levels of futures contracts.

In overview, the system operates as follows. The point-of-sale stations, which may be remote terminals, stand-alone personal computers or the like, as is well known, serve as data entry points for customer transactions including customer identification, insurance unit purchases and renewals, unit cancellations resulting from investor- or broker-initiated sales of insured futures contracts, and insurance-activated sales when the price of the futures contract has declined below the insurance activation price. The point-of-sale stations transmit the record of customer transactions to the central office computer.

The central office computer receives, tests and processes the customer transaction data from the multiple point-of-sale stations. The central system provides management with information concerning the number and type of futures contracts currently insured. The central system also provides management with information about how the current investment portfolio matches the current projection of possible loss claims against the insurance plan. The central system provides management with a daily report of premium income. As noted above, other suitable reports may be generated as well.

The central office computer also receives and processes real-time data regarding current futures contracts prices from exchange data feeds. By comparing the current price with the purchase price of the futures contract, the central office computer is able to determine when the insured's loss has exceeded the insurance activation price, at which time the futures position is to be sold by the broker.

The programming steps required to perform the functions described herein are not considered inventive, apart from the overall functions performed thereby. In other words, it is well within the ability of a person of ordinary skill in the art to create the computer programs, once having read this disclosure, necessary to create and operate the inventive apparatus and methods.

With the foregoing overview in mind, the detailed operation of the system can be understood by referring to FIGS. 1-5.

Figure 1:
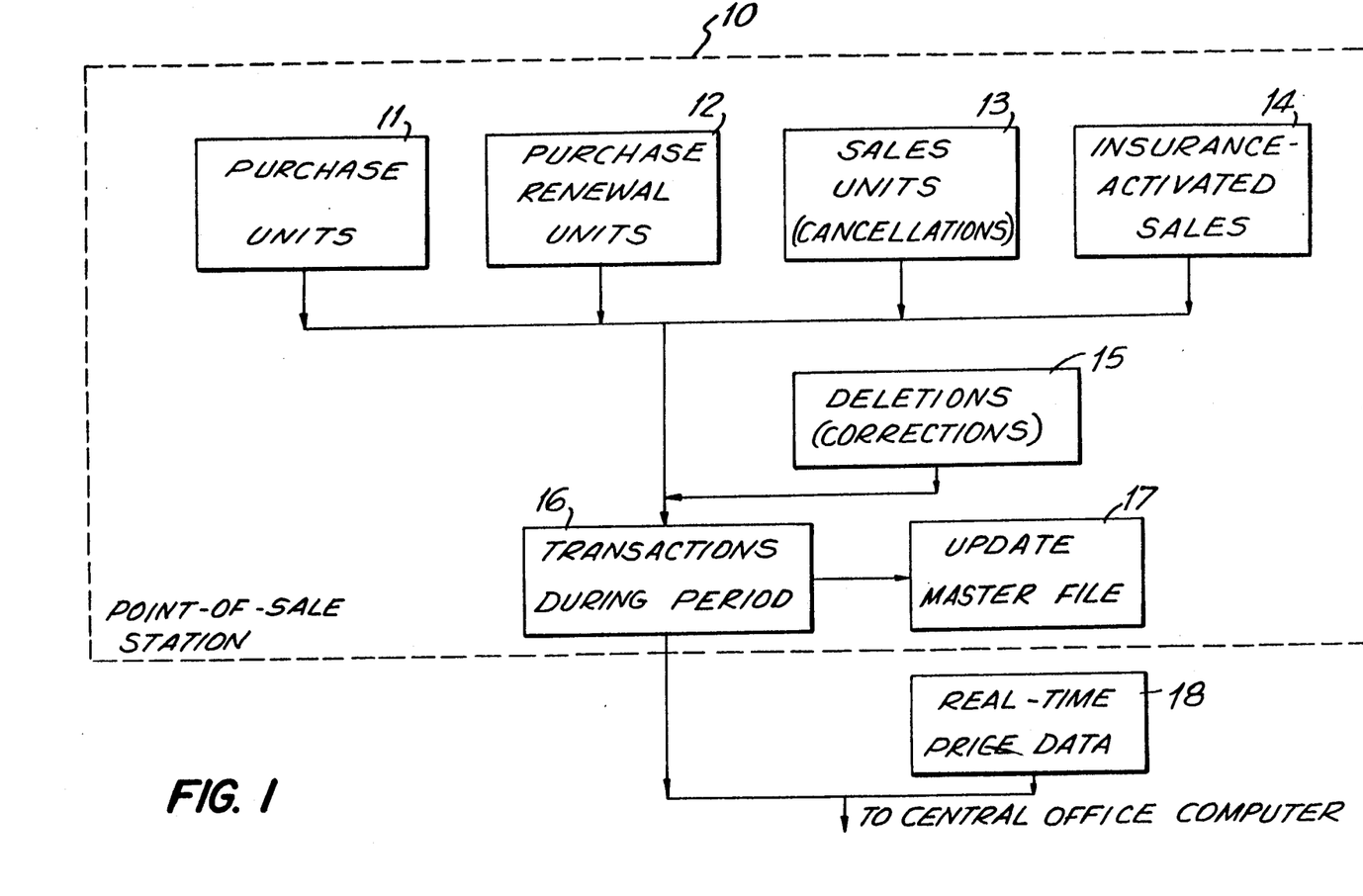
FIG. 1 is a schematic flow chart depicting that part of the data processing methodology and structure that consists of processing new customer transactions at the point-of-sale station and transmitting them to the central office computer.

As shown in FIG. 1, the system operation of the treatment of new customer transactions as performed at the point-of-sale station 10 consists of functional blocks 11-17. Customer transactions can be insurance unit purchases (block 11), insurance unit renewals (block 12), customer- or broker-initiated sales of insured futures contracts resulting in the cancellation of insurance contracts (block 13), insurance-activated sales of insured futures contracts (block 14), and deletions and corrections of previously submitted data (block 15).

Purchase unit data are entered at block 11. Each purchase unit data entry typically includes broker identification (the customer will always be a broker, regardless of whether the insurance is discretionary and requested by an individual investor or whether there is an arrangement between the insurer and the broker that all risk-producing purchases of futures contracts are automatically insured), the number of contracts insured, the trading symbol for the underlying index or commodity and the month of expiration of the futures contract, the price and time at which the futures contract was bought, and an identification number for the broker's customer. Since each incoming batch is time- and date-stamped, the purchase date is not required in the data entry.

Thus, a typical purchase unit in a particular customer batch might be identified as follows:

PURCHASE; LW; 5 SPH; 331.60; 11:24 AM; #107. This data represents, according to the invention, a purchase unit by broker LW of insurance on five March S&P 500 Index futures contract which were purchased at 11:24 a.m. at the price 331.60, for LW's customer #107. It will be readily understood that numerous variations as to the types of information contained in a purchase unit message as well as the protocols for transmitting and displaying such data are possible without departing from the spirit or scope of the invention.

Renewal unit data are entered at block 12. Insurance renewals for futures contracts that will be held over night may be ordered either before or after trading has ended for the day, but must be ordered before the market opens on the following trading day. A renewal unit in a particular customer batch might be identified as follows:

RENEWAL; LW; 5 SPH; Opening; 3:05 PM; #107. The time entry shows when the renewal was ordered by the customer. Since, in accordance with an aspect of the invention, the renewal becomes effective when trading begins on the next trading day, the new purchase price will be the opening price of the futures contract on the next trading day. The new insurance activation price will be the contractually specified number of points below the new purchase price.

There may be no way to cover possible loss claims on renewals ordered late in the trading day if the insurer doesn't have time to update the investment portfolio. Therefore, the insurer may desirably choose not to accept renewals submitted after a certain time, such as 3:45 PM. It should be noted, however, that where insurance is mandated by either the broker or the exchange, it may not be possible for the insurer to adopt a cut-off time on such renewals.

When the investor has sold the insured futures contract he no longer has an insurable interest and the insurance is cancelled. Sales unit data are entered at block 13. Each sales unit must be completely identified so that it can be matched against the correct purchase unit. Thus, an insurance sales unit in a particular customer batch will be identical to its corresponding purchase unit, except that it will be labelled as a sale and might report a sale of only part of the total contracts held, as shown in the following example:

SALE; LW; 3 SPH; 331.60; 11:24 AM; #107. This sales unit indicates sale of three of the aforementioned five March S&P 500 Index futures contracts which were previously reported as purchased at 11:24 a.m. at the price 331.60for LW's customer #107.

Data on insurance-activated sales are entered at block 14. An insurance-activated sale is defined as a sale of the insured futures contract at a price lower than the insurance activation price. Each insurance-activated sale unit must similarly by completely identified so that it can be matched with the correct purchase unit at the central office computer. Data entry for an insurance-activated sale unit should be identical to its corresponding purchase unit, except that (1) it will be labelled as "INSURED" and (2) it must also include the sales price of the futures contract, as seen in the following example:

INSURED; LW; 5 SPH; 331.60; 11:24 AM; Sold 305.50; #107.

Corrections to transmission mistakes discovered by the point-of-sale station may suitably be entered at block 15. Thus, if the transmitted data indicated that 5 SPH contracts had been insured when the correct number was 15, a correcting data entry message would be sent by the broker, identical to the corresponding erroneous purchase unit, except that it would be labelled as "DELETE".

DELETE PURCHASE; LW; 5 SPH; 331.60; 11:24 AM; #107.

Or, if a customer decided not to renew after the renewal unit had been transmitted to the insurer but before the renewal would have taken effect, the correcting data entry would be:

DELETE RENEWAL; LW; 5 SPH; Opening; 3:05 PM; #107.

A delete entry is treated as a negative entry. It travels through the system operation until it meets its positive counterpart, at which point they cancel each other out from subsequent steps in the process. The corrected data would be resubmitted by the point-of-sale station as an original transmission.

The forms of data entries depicted above are intended to be suggested examples which illustrate the requirements of the methodology. Other forms of data entry would be equally acceptable.

The data are transmitted immediately upon entry and accumulated for processing at the central office computer. Alternatively, the transaction data can be stored at block 16 for periodic transmission to the central office computer. Next, the system operation passes to block 17, where all daily transactions are stored in the broker's master file. The master file consists of a library file which serves as a reference for all customer transaction data transmitted to the insurer, and a working file for further processing. At block 17 all transactions are sent to both the library and the working file.

In addition to the system operation at the point-of-sale station depicted above, much of the methodology and procedures discussed in detail as occurring at the central office computer may also advantageously be utilized at the point-of-sale station. For example, the continuous updating of open purchase units during the day by matching sales units against purchase units, or the accumulation of purchase units in the working files to arrive at daily premium expense, are among the computer processes that may advantageously be performed by both the customer and the insurer.

Real-time price level data are entered at block 18 and is continuously transmitted to the central office computer. A continuous record of times and prices for each different contract month is stored at the central office computer. Any of a number of well-known data feeds are available for this purpose.

Figure 2:
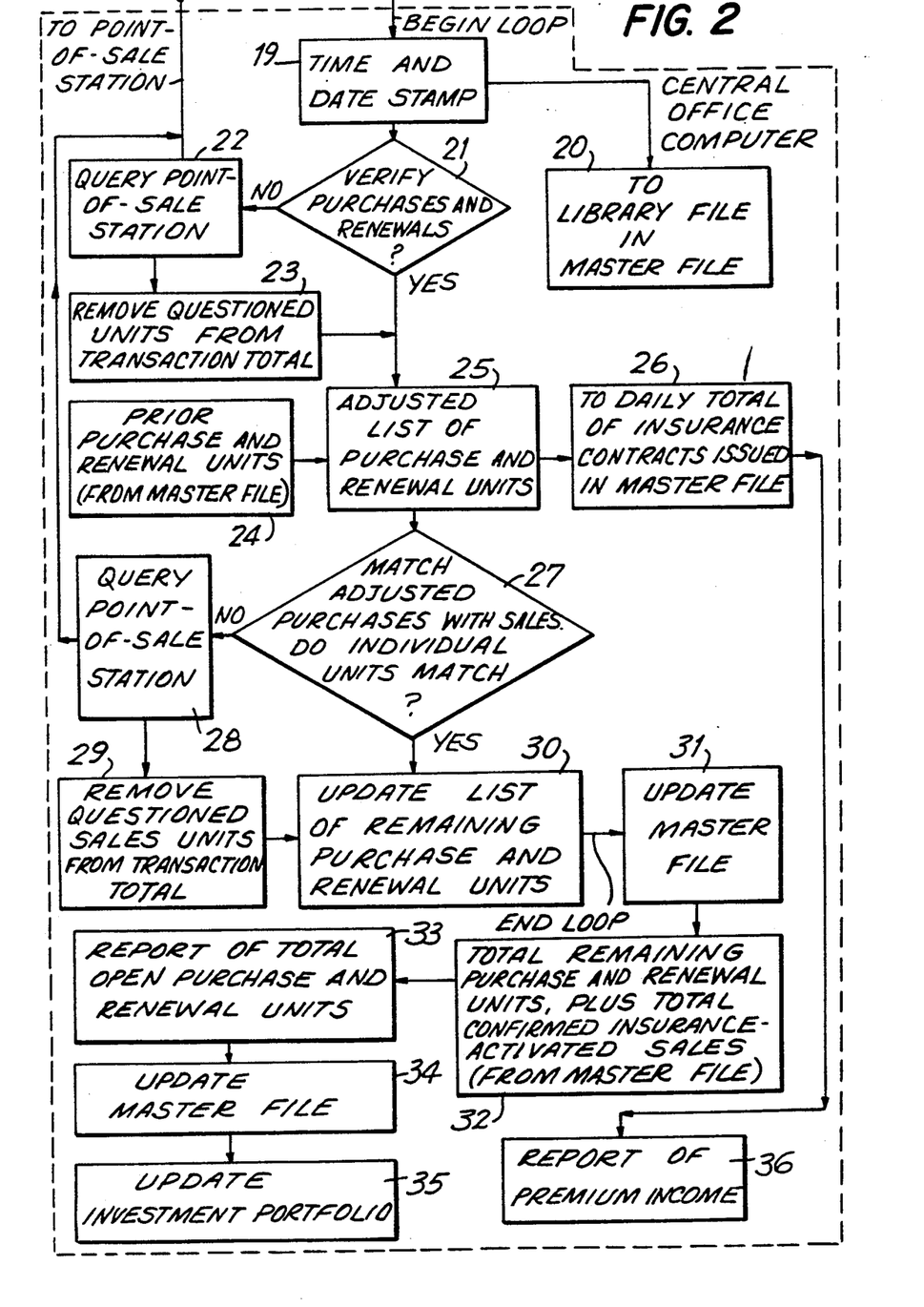
FIG. 2 is a schematic flow chart depicting that part of the data processing methodology and structure in which new purchase, renewal, sales and error correction units are processed at the central office computer.

As shown in FIG. 2, each new incoming purchase, renewal, sales or error correction unit in a customer batch is processed by the central office computer individually in a loop beginning with block 19 and ending at block 30 prior to further data processing in accordance with block 31 and those which follow, where the customer batch is combined with the transaction units from all the other customers.

System operation according to the invention starts at block 19, where all incoming data are time and date stamped. All incoming data then flows to block 20, where the data are added to a library file (as distinguished from the working files which are updated as required) in the master file. The library file is the insurer's record of all transmissions received from the customer.

Incoming purchase and renewal units are first subjected to verification test 21, where the accuracy of the data is checked for reasonableness, in accordance with well-known methods and criteria. For example, the reported purchase price and time of purchase are checked against the real-time price data. Too large a discrepancy between the reported purchase price and the price at that time according to the real-time price data will be questioned. Also tested at this point is the requirement, where in effect, that the insurance order be reported to the central office computer within five minutes of its being ordered.

If the transmitted data for a purchase unit are considered inaccurate the system operation passes to block 22, where the central office queries the point-of-sale station. Also, if the insurer elects not to accept the insurance order because the five minute reporting requirement was not met, then the point-of-sale station is notified at block 22. The system operation then proceeds to block 23, where the questioned purchase units are removed from the transaction totals. Purchase and renewal data which have been questioned and corrected are resubmitted by the point-of-sale station as original transmissions at blocks 11, 12 and 16 of FIG. 1.

Next, the working portion of the master file at block 31 is searched and the customer's prior purchase and renewal units for that day are accessed (block 24). These accessed customer units are combined with the newly verified purchase and renewal units to create the customer's adjusted list of purchase and renewal units at block 25.

Next according to the invention, purchase units from the customer's adjusted list of purchase and renewal units are added to the prior accumulated daily total of insurance contracts issued by all customers, the latter list being maintained in the working files of master file at block 26. The finalized daily total is used to generate a daily report of premium income to the insurer.

At test 27 the incoming sales (cancellation) units are matched against the adjusted list of purchase and renewal units. The matching process distinguishes between a mismatch and a partial match of a portion of the total contracts held, such as a sale of three of the five contracts held. If a sales unit does not otherwise exactly match a purchase unit (either total or partial) then the system operation passes to block 28, where the central office queries the point-of-sale station. Sales data which have been questioned and corrected are resubmitted by the point-of-sale station as original transmissions at blocks 13 and 16 of FIG. 1.

Any questioned sales (cancellation) units are removed from the transaction totals at block 29. For those sales units which exactly match an open purchase unit, the system operation passes to block 30, where they cancel each other out, making provision for sales of part of the total held, and an updated list of remaining purchase units plus renewal units is produced. Thereafter, the updated list is transmitted to the working files of the master file (at block 31) and combined with totals from other customers to await further processing.

Next, according to the invention, the total remaining purchase and renewal units from all customers, just updated at block 31, are accessed (at block 32) from the master file. Also accessed is the report of confirmed insurance-activated sales for all customers (see block 44 of FIG. 3, described hereinbelow). At block 33, the remaining purchase units are matched with their corresponding insurance-activated sales units, where they cancel each other out, and a report of total open purchase and renewal units from all customers, i.e., a report of insurance contracts still in force plus renewals received to date, is generated.

Next, the system operation passes to block 34, where the working files in the master file are again updated, and then to block 35, where the report of total open purchase and renewal units is the basis for updating the investment portfolio.

At block 36, the day-end total of insurance contracts issued from block 26 is used to prepare a daily report of premium income in total and by customer. Premium income should not include renewals prior to their being treated as new purchase units on the following day of trading.

Figure 3:
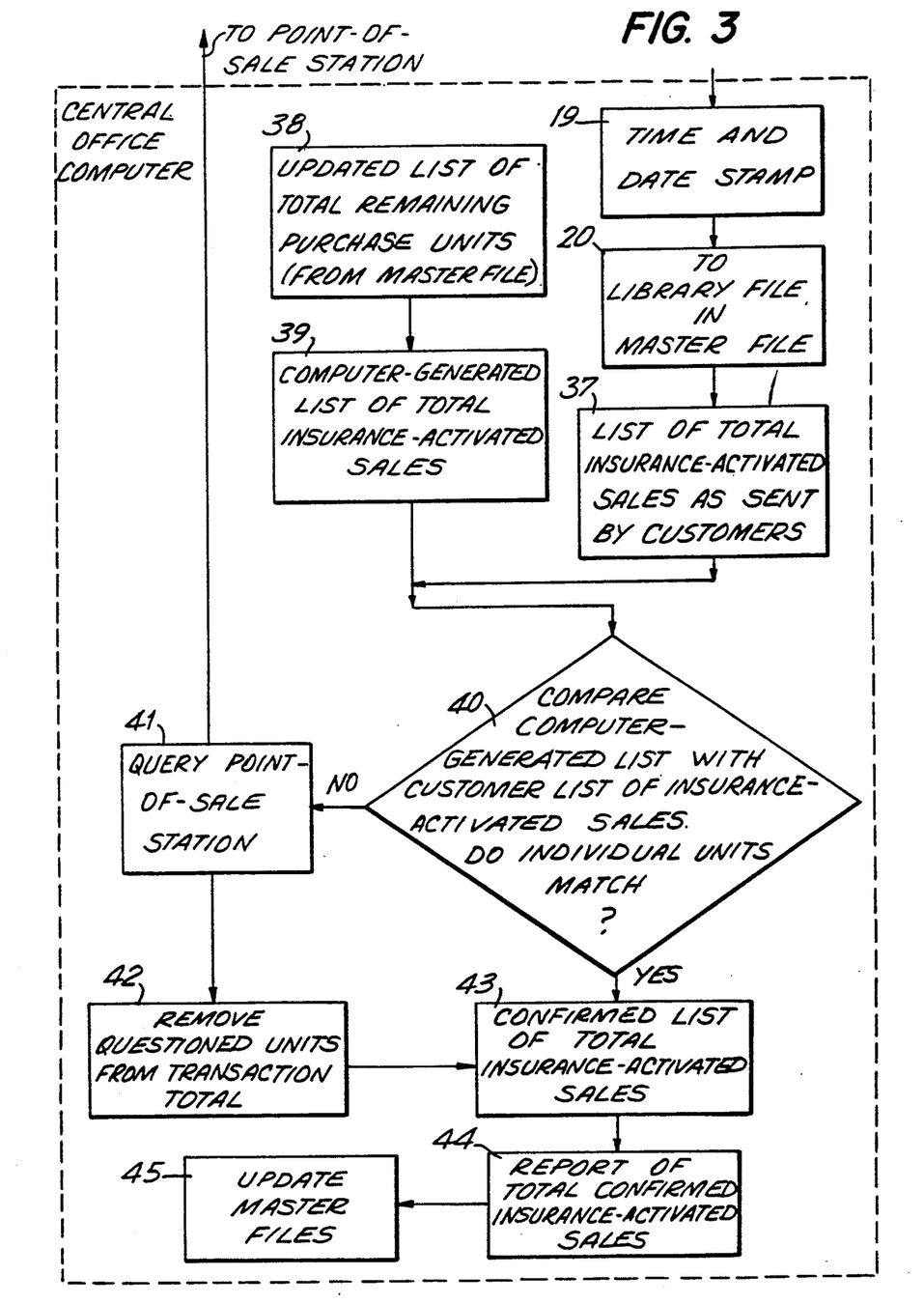
FIG. 3 is a schematic flow chart which depicts that part of the data processing methodology and structure in which insurance-activated sales units are processed at the central office computer.

Now turning to FIG. 3, there is shown schematically a portion of the data processing methodology and apparatus for processing insurance-activated sales units for use in the system operation steps of FIG. 2, at blocks 32–35. As was seen in FIG. 2, the report of confirmed insurance-activated sales for all customers was used to match the remaining purchase units with their corresponding insurance-activated sales units, to generate a report of insurance contracts still in force plus renewals received to date.

According to FIG. 3, incoming insurance-activated sales units from point-of-sale stations are processed beginning with blocks 19 and 20, and then to blocks 37 through 44 prior to further processing in accordance with block 32 and those which follow.

After the insurance-activated sales units are time- and date-stamped at block 19, they are added to the library file in the master file at block 20.

Then, at block 37, the system produces a list of total customer-provided insurance-activated sales units that day, by selecting such data from the master file.

System operation next passes to block 38, where the updated list of all customers, total remaining purchase units is accessed from the working portion of the master file. At block 39, this updated list is combined with real-time price data to produce a computer-generated list of total cases in which the insurance activation price for remaining purchase units has been reached. This list of total insurance-activated sales is independently arrived at by the insurer, and should agree with the list accessed from the master files at block 37 in all respects except the prices at which the futures contracts were sold.

The customers' list of total insurance-activated sales from block 37 is compared with the insurer's computer-generated list from block 39, at verification test block 40. If a particular sales unit transmitted by the customer is not verified by this comparison the system operation passes to block 41, where the central office queries the point-of-sale station. The system operation next goes to block 42, where the questioned insurance-activated sales units are removed from the transaction totals. Insurance-activated sales data which have been questioned and corrected are resubmitted by the point-of-sale station as original transmissions at blocks 14 and 16 of FIG. 1, as previously described.

Once the questioned units have been removed from the transaction total (or if no units were questioned in the first place), system operation proceeds to block 43 where the verified insurance-activated sales units are used to produce a list of confirmed insurance-activated sales and the prices at which the sales were made. Next, a report of confirmed insurance-activated sales is produced at block 44. The report is transmitted at block 45 to the working files of the master file to await further processing.

Figure 4:
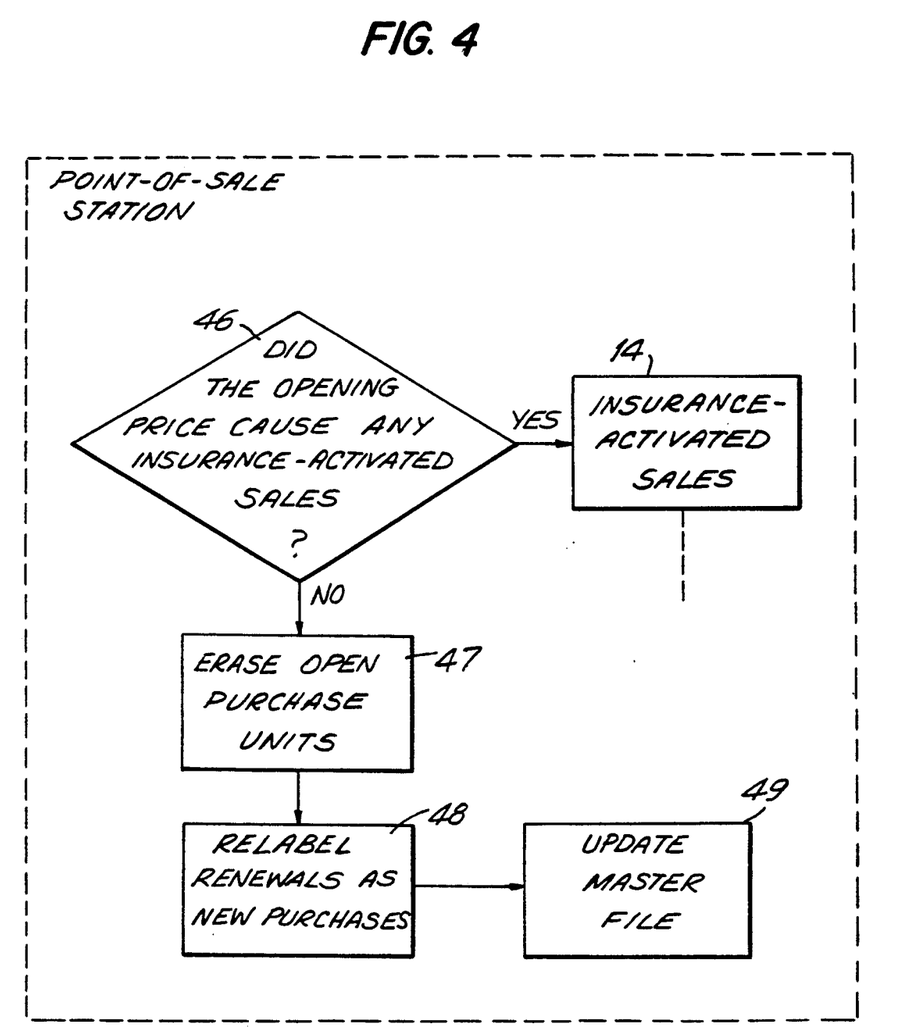
FIG. 4 is a schematic flow chart which depicts that part of the data processing methodology and structure at the point-of-sale station in which takes place the further processing, when trading begins on the following day, of those purchase and renewal units which are still viable at the close of trading on the prior day.

As shown in FIG. 4, when the next day of trading begins, open purchase units and renewal units are processed at the point-of-sale station beginning with block 46 and ending at block 49 prior to further processing in accordance with FIG. 1 and/or FIG. 2.

At test 46 the system determines whether the opening futures price caused any insurance-activated sales of purchase units that were still open after the close of trading on the previous day. This determination is made, according to this described embodiment of the invention, by comparing the opening futures price to the purchase price of the still open purchase units. If the opening price is ten points (continuing with the example described in the Background of The Invention section above) smaller than the purchase price, the determination is "affirmative" and the system operation passes to block 14, where the insurance-activated sales are processed for transmission to the central office computer, as hereinbefore described, before proceeding to block 47. If the determination is "negative" then system operation passes immediately to block 47, where all open purchase units are erased from the working portion of the master file, and any reports of total open purchase units and renewal units are erased.

Next, at block 48, all renewals are relabelled as new purchase units ordered as of the opening of trading, so that the new purchase price for each will be the opening price. Both the library and working files of the master file are updated with these adjusted data at block 49.

Figure 5:
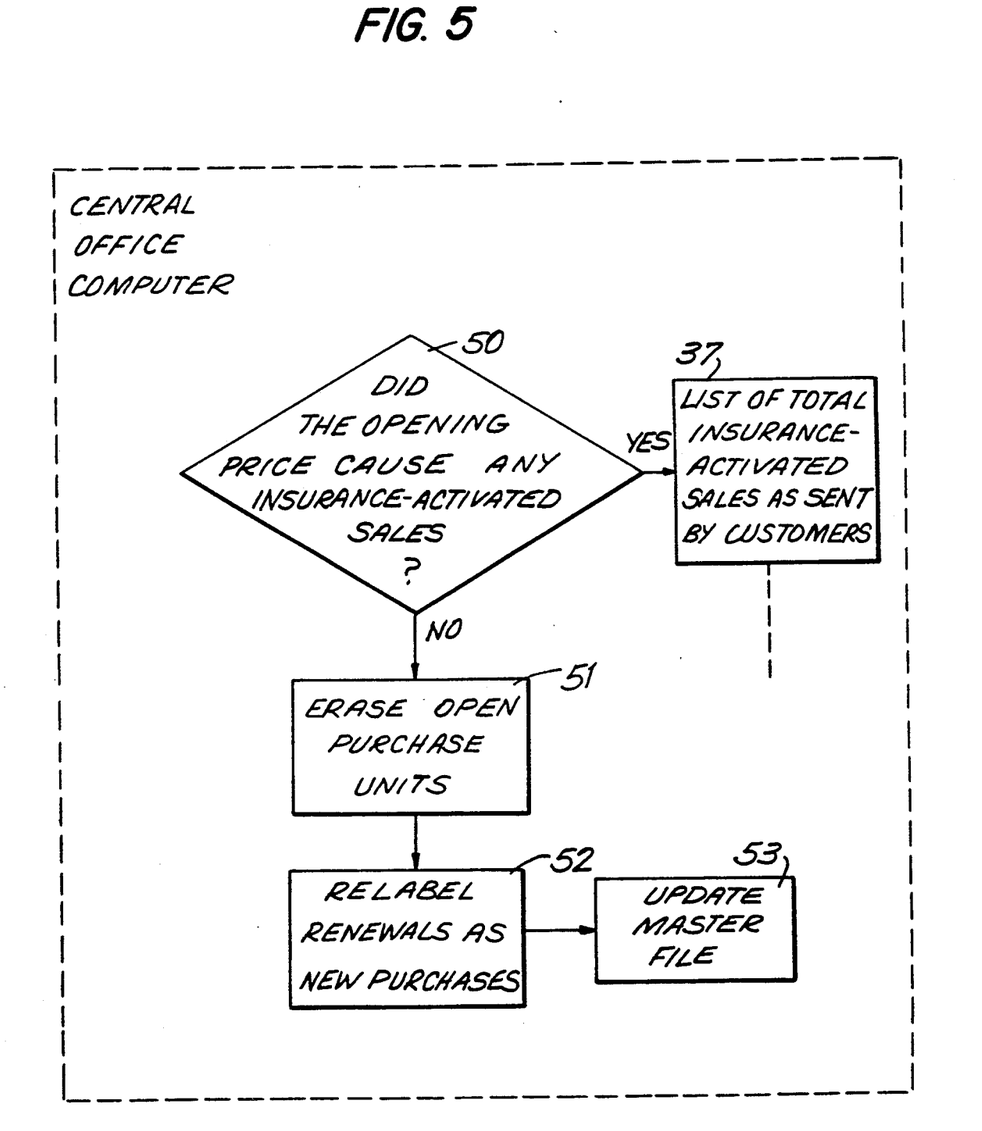
FIG. 5 is a schematic flow chart which depicts that part of the data processing methodology and structure at the central office computer in which takes place the further processing, when trading begins on the following day, of those purchase and renewal units which are still viable at the close of trading on the prior day.

As FIG. 5 shows with respect to the central office computer, when the next day of trading begins, open purchase units and renewal units are processed at the central office computer beginning with block 50 and ending at block 53 prior to further processing in accordance with FIG. 2.

First, test 50 asks whether there were any insurance-activated sales caused by the opening price. If the answer is "yes" system operation passes to block 37 for central office processing of insurance-activated sales, as hereinbefore described, before proceeding to block 51. If the answer is "no" then system operation proceeds immediately to block 51, where all open purchase units are erased from the working files of the master file, and then on to block 52, where all renewals are relabelled as new purchase units ordered as of the opening of trading, so that the new purchase prices are the opening prices. Lastly, both the library and working files of the master file are updated at block 53. Relabelled new purchase units are included in the daily total of insurance contracts issued.

Although the invention is described and illustrated with reference to an embodiment dealing with the purchase of futures contracts, it is to be expressly understood that it is in no way limited to the disclosure of this preferred embodiment but is capable of numerous modifications within the scope of the appended claims.

I claim:

1. A data processing system for administering an insurance program to insure against uncertainty of a futures contract price, the data processing system comprising:

data communications means for remotely entering customer transaction data relating to a futures contract sales transaction into a central processor of the data processing system;

the futures contract sale transaction being a particular one of a group of futures contract sale transactions consisting of customer-initiated sale, broker-initiated sale, and insurance-activated sale;

the customer transaction data including (i) identification of the futures contract, (ii) customer identification, (iii) transaction type identification, the transaction being one of a group of transaction types consisting of insurance unit purchase, insurance unit renewal, and futures contract sale, and (iv) a futures contract purchase price;

means responsive to receipt by the central processor of the customer transaction data including data concerning the insurance-activated ale, for determining portions of a loss resulting from the insurance-activated sale which are to be (i) borne entirely by the customer, (ii) shared by at least one predetermined ratio by the customer and an insurer, and (iii) borne entirely by the insurer;

means for receiving and storing the customer transaction data in the central processor;

means for determining an insurance activation price based upon the futures contract purchase price stored in the central processor;

means for receiving real-time data concerning a current price of the futures contract;

means for comparing the current price of the futures contract with the insurance activation for the futures contract; and means for transmitting an order to the data communication means to sell the futures contract upon decline of the current futures contract price below the insurance activation price.

* * * * *

UNITED STATES PATENT AND TRADEMARK OFFICE
CERTIFICATE OF CORRECTION

PATENT NO. : 5,202,827

DATED : April 13, 1993

INVENTOR(S) : MICHAEL S. SOBER

It is certified that error appears in the above-identified patent and that said Letters Patent is hereby corrected as shown below:

Column 2, line 29 "insurer" should be replaced by

-- insured --.

Signed and Sealed this

Twenty-first Day of December, 1993

*Attest:*

BRUCE LEHMAN

*Attesting Officer*     *Commissioner of Patents and Trademarks*